(12) United States Patent
Pidan et al.

(10) Patent No.: US 10,946,527 B2
(45) Date of Patent: Mar. 16, 2021

(54) MANIPULATOR COMPRISING A MANIPULATOR ARM

(71) Applicant: BA Assembly & Turnkey Systems GmbH, Bietigheim-Bissingen (DE)

(72) Inventors: Sergej Pidan, Winnenden (DE); Thomas Oetken, Bremen (DE)

(73) Assignee: BA Assembly & Turnkey Systems GmbH, Bietigheim-Bissingen (DE)

( * ) Notice: Subject to any disclaimer, the term of this patent is extended or adjusted under 35 U.S.C. 154(b) by 499 days.

(21) Appl. No.: 15/323,040

(22) PCT Filed: Jun. 30, 2015

(86) PCT No.: PCT/EP2015/064865
§ 371 (c)(1),
(2) Date: Dec. 29, 2016

(87) PCT Pub. No.: WO2016/001235
PCT Pub. Date: Jan. 7, 2016

(65) Prior Publication Data
US 2017/0232618 A1    Aug. 17, 2017

(30) Foreign Application Priority Data
Jun. 30, 2014   (DE) ..................... 10 2014 009 478.2

(51) Int. Cl.
*B25J 11/00* (2006.01)
*B25J 17/02* (2006.01)
(Continued)

(52) U.S. Cl.
CPC ........... *B25J 11/005* (2013.01); *B21J 15/142* (2013.01); *B25J 15/0019* (2013.01);
(Continued)

(58) Field of Classification Search
CPC .. B25J 11/005; B25J 15/0057; B25J 15/0066; B25J 15/0019; B25J 17/0283;
(Continued)

(56) References Cited

U.S. PATENT DOCUMENTS 5,311,770 A    5/1994  D'angelo et al.
5,974,643 A *  11/1999  Hays .................. B23Q 17/2233
                                                               29/39
(Continued)

FOREIGN PATENT DOCUMENTS

DE    3738619    6/1989
DE    60007243   9/2004
(Continued)

OTHER PUBLICATIONS

"German Search Report," for Priority Application No. DE102014009478.2 dated Apr. 27, 2015 (9 pages).
(Continued)

*Primary Examiner* — Cuong B Nguyen
(74) *Attorney, Agent, or Firm* — Pauly, DeVries Smith & Deffner LLC (57) ABSTRACT

A manipulator has a manipulator arm with a manipulator flange at one free end. The flange holds an end effector having an application device for machining a workpiece. The manipulator flange is rotatable about hand axes. A first hand axis extends in the direction of the longitudinal axis of the manipulator arm, a second hand axis extends transversely to the first hand axis and a third hand axis extends transversely to the second hand axis. The hand axes intersect at a common intersection point. A machining force acting on the application device is diverted into the manipulator arm by way of the end effector. So that process forces during a mechanical operation do not lead to impairment of the machining pose of the manipulator arm, provision is made (Continued)

to fix the application device to the manipulator flange at an attachment angle to the first hand.

4 Claims, 3 Drawing Sheets

(51) Int. Cl.
*G05B 19/19* (2006.01)
*B25J 15/00* (2006.01)
*B21J 15/14* (2006.01)

(52) U.S. Cl.
CPC ....... *B25J 15/0057* (2013.01); *B25J 15/0066* (2013.01); *B25J 17/0283* (2013.01); *G05B 19/19* (2013.01); *G05B 2219/45094* (2013.01); *Y10S 901/41* (2013.01)

(58) Field of Classification Search
CPC ................. B21J 15/142; Y10S 901/41; G05B 2219/45094; G05B 19/19
See application file for complete search history.

(56) References Cited

U.S. PATENT DOCUMENTS

| | | | |
|---|---|---|---|
| 6,467,145 | B1 | 10/2002 | Porta |
| 7,729,796 | B2 | 6/2010 | Dehlke et al. |
| 7,805,829 | B2 | 10/2010 | Moessner et al. |
| 2013/0273818 | A1 | 10/2013 | Guan et al. |
| 2015/0127158 | A1* | 5/2015 | Shimodaira .......... G05B 19/401 700/258 |

FOREIGN PATENT DOCUMENTS

| | | |
|---|---|---|
| DE | 102004005859 | 8/2005 |
| DE | 102004006407 | 9/2005 |
| DE | 112005002827 | 11/2007 |
| DE | 202008014886 | 5/2010 |
| DE | 19637177 | 4/2015 |
| DE | 3432773 | 2/2016 |
| JP | 11207685 | 8/1999 |
| JP | 2011110629 | 6/2011 |
| WO | 2016001235 | 3/2016 |

OTHER PUBLICATIONS

"International Search Report and Written Opinion," for Corresponding PCT Application No. PCT/EP2015/064865 dated Feb. 8, 2016 (20 pages).

"International Preliminary Report on Patentability" for Corresponding PCT Application No. PCT/EP2015/064865 dated Jan. 12, 2017 (18 pages).

* cited by examiner

MANIPULATOR COMPRISING A MANIPULATOR ARM

CROSS-REFERENCE TO RELATED APPLICATIONS

This application is a national stage application under 35 U.S.C. 371 of International Patent Application Serial No. PCT/EP2015/064865, entitled "Manipulator mit einem Manipulatorarm," filed Jun. 30, 2015, which claims priority from German Patent Application No. DE 10 2014 009 478.2, filed Jun. 30, 2014, the disclosure of which is incorporated herein by reference.

FIELD OF THE TECHNOLOGY

The disclosure relates to a manipulator having a manipulator arm.

BACKGROUND

A known manipulator, e.g. a buckling arm robot, has six axes about which a manipulator flange can be moved. An end effector having application devices, such as, for example, machining tools for boring, milling or reaming or, for example, measuring instruments for the positioning of the end effector or the application device or for recording the geometry of the workpiece or for measuring bore holes and the like is provided on the manipulator flange. The process forces occurring during the mechanical machining operation are absorbed at the manipulator flange and, depending on the pose of the robot, act around all six axes. The moments generated around the respective main and hand axes of the manipulator as a result of occurring process forces have an effect on the machining accuracy since the moments can push the robot out of its predetermined desired machining position.

SUMMARY

The disclosure is based on the object of developing a manipulator having a manipulator arm in such a way as to reduce the effects of the process forces occurring during machining on the positional accuracy of the end effector with respect to the workpiece.

The hand axes of a wrist at the end of a manipulator arm have a common intersection region. According to various embodiments, the application device is attached to the manipulator flange at an attachment angle to the third hand axis in such a way that the direction of a counter force supporting the machining force extends through the intersection region of the three hand axes. It is thus ensured that occurring process forces do not impair the machining position of the robot arm as a result of moments occurring around the hand axes. The intersection region is advantageously a spherical region here with a radius of less than 100 mm. If the arrangement is such that the direction of the machining force extends through a common intersection point of the hand axes, all possible moments around the hand axes resulting from process forces are eliminated.

It has proven expedient to attach the application device to the manipulator flange of the manipulator arm in such a way that the direction of the force to be supported lies at an attachment angle to the third hand axis which is selected in the range between 5° and 60°.

The application device is advantageously held on the manipulator flange by way of a load-bearing support, wherein the machining forces acting on the application device act in a direction which extends through the intersection region of the hand axes and which, for at least one intended position of the application device, lies below the attachment angle to the third hand axis of the wrist. In the case of an application device which is arranged in a fixed manner on the load-bearing support, the direction of the machining forces here forms the attachment angle with the third hand axis. In the case of an application device which is arranged in a pivotable manner on the load-bearing support, for at least one intended position of the application device the direction of the machining forces lies advantageously below the attachment angle to the third hand axis. For all intended positions of the application device, the direction of the machining forces passes through the intersection region of the hand axes. Provision is made here for the pivot axis of a joint by way of which the application device is mounted on the load-bearing support to be aligned such that the direction of the machining forces extends through the intersection region or through the intersection point of the three hand axes in each pivot position of the application device. The third hand axis of the wrist here is the axis of rotation of the manipulator flange with respect to a housing part of the wrist.

In a further embodiment, provision is made for the end effector to comprise a plurality of application devices whereof the machining axes coincide with surface lines or lateral lines of a cone whereof the apex lies in the intersection region of the hand axes. The machining axes here coincide advantageously with surface lines of a cone whereof the apex lies in the intersection point of the hand axes or lie at a slight spacing parallel offset from surface lines of this cone.

In the case of a manipulator having a manipulator arm at the free end of which a manipulator flange is arranged on which an end effector having an application device for machining a workpiece is provided, the end effector is rotatable about three hand axes. A first hand axis extends in the direction of the longitudinal axis of the manipulator arm, a second hand axis extends transversely to the first hand axis and a third hand axis lies transversely to the second hand axis. The end effector supports a plurality of application devices which follow one another in the direction of rotation of the third hand axis, wherein the application devices can be moved into an active operating position by rotation of the end effector about the third hand axis. As a result of this design, it is achieved that separate drives for adjusting the application devices with respect to the manipulator flange are omitted. It is possible to change the tool or to change the application device by rotating the manipulator flange about the third hand axis relative to the manipulator arm.

The rotatable end effector expediently has a frame structure which, by way of a coupling, is non-rotatably connected to a housing part of the manipulator arm in a first coupling position and is non-rotatably connected to the manipulator flange in a second coupling position. The coupling here comprises driver elements of the end effector and a clamping device acting between the housing part and the frame structure.

In various embodiments, a ram sleeve is held on the frame structure. The ram sleeve can be moved along a machining axis towards the workpiece. It is thus possible to tension the manipulator arm having the end effector against the workpiece, which increases the positional accuracy during the machining operation. The forces introduced at the ram sleeve can be introduced directly into the housing part by way of the frame structure and the coupling. The load on the third hand axis is thus relieved.

To increase the performance of a manipulator, provision is made so that, in a method for connecting components by means of a bolt, in particular by means of a rivet bolt, using a manipulator, an end effector having application devices is provided at the end of a manipulator arm. The application devices serve for measuring and machining the workpiece, wherein the end effector is positioned in a first operating step, a through-bore is bored into the workpiece in a second operating step, a bolt is supplied in a subsequent operating step and the bolt is seated and secured in a following operating step. To increase the performance, provision is made for the application devices of the end effector to be used in such a way that two operating steps can be executed simultaneously. It is therefore possible to subject the workpiece to different operating steps simultaneously, for example in order to bore a through-bore and simultaneously insert and secure a bolt in another through-bore. The simultaneously executed operating steps are advantageously executed in an unaltered relative position of the end effector with respect to the workpiece. The simultaneously executed operating steps are, in particular, applied to different through-bores, such as adjacent through-bores.

To align two application devices of an end effector relative to a workpiece with positional accuracy, provision is made for the application devices to be held on the manipulator flange such that they are adjustable relative to one another in terms of their position. A first application device is expediently non-adjustably held here on the manipulator flange and can be aligned together with this, whilst a second application device is held on the manipulator flange by means of an adjusting device which is capable of altering the position of said application device. The second application device can therefore be aligned relative to the workpiece after the alignment of the first application device with the machining position.

An embodiment provides a manipulator having a manipulator arm at the one free end of which a manipulator flange is provided on which an end effector having an application device for machining a workpiece is held, wherein the manipulator flange is rotatable about hand axes and a first hand axis extends in the direction of the longitudinal axis of the manipulator arm, a second hand axis extends transversely to the first hand axis and a third hand axis lies transversely to the second hand axis, and a machining force acting on the application device is diverted into the manipulator arm by way of the end effector, wherein the hand axes intersect one another in a common intersection region and in that the application device is fixed to the manipulator flange at an attachment angle to the third hand axis in such a way that a machining force occurring at the application device is diverted in a direction towards the manipulator arm, which direction extends through the intersection region of the hand axes.

In various embodiments, the intersection region of the hand axes forms a common intersection point.

In various embodiments, the attachment angle lies in the range between 5° and 60°.

In various embodiments, the application device is held on the manipulator flange by way of a load-bearing support, wherein the machining forces acting on the application device act in a direction which extends through the intersection region of the hand axes and which, for at least one intended position of the application device, lies below the attachment angle to the longitudinal axis of the manipulator arm.

In various embodiments, the end effector comprises a plurality of application devices whereof the machining axes coincide with surface lines of a cone whereof the apex lies in the intersection region of the hand axes.

An embodiment provides a manipulator having a manipulator arm at the free end of which a manipulator flange is provided on which an end effector having an application device for machining a workpiece is held, wherein the manipulator flange is rotatable about hand axes and a first hand axis extends in the direction of the longitudinal axis of the manipulator arm, a second hand axis extends transversely to the first hand axis and a third hand axis lies transversely to the second hand axis, wherein the end effector is rotatably mounted on the wrist of the manipulator arm, in that the end effector has a plurality of application devices which follow one another in the circumferential direction on a lateral surface of an imaginary cone, wherein an application device can be moved into an active operating position by rotation of the manipulator flange about the third hand axis.

In various embodiments, the rotatable end effector has a frame structure which, by way of a coupling, is non-rotatably connected to a housing part of the manipulator arm in a first coupling position and is non-rotatably connected to the manipulator flange in a second coupling position.

In various embodiments, the coupling comprises driver elements of the end effector and a clamping device acting between the housing part and the frame structure.

In various embodiments, a ram sleeve, which is movable along a machining axis of the tool towards the workpiece, is held on the frame structure.

An embodiment provides a method for connecting components by means of a bolt, in particular by means of a rivet bolt, using a manipulator, wherein the manipulator supports an end effector at the end of a manipulator arm, which end effector has application devices for measuring and machining the workpiece, and the end effector is positioned in a first operating step, a through-bore is bored into the workpiece in a second operating step, a bolt is supplied in a subsequent operating step and the bolt is seated and secured in a following operating step, wherein at least two operating steps to be executed by two application devices of the end effector are executed simultaneously.

In various embodiments, the simultaneously executed operating steps are executed in an unaltered relative position of the end effector with respect to the workpiece.

In various embodiments, the simultaneously executed operating steps are implemented on different through-bores.

In various embodiments, during the positioning of the end effector with respect to the workpiece, two application devices are simultaneously aligned in an active operating position and both aligned application devices act simultaneously on the workpiece.

An embodiment provides a device for carrying out the method as described herein. The device having a manipulator and a manipulator arm at the free end of which a manipulator flange is provided on which an end effector having an application device for machining a workpiece is held, wherein the manipulator flange is rotatable about hand axes and a first hand axis extends in the direction of the longitudinal axis of the manipulator arm, a second hand axis extends transversely to the first hand axis and a third hand axis lies transversely to the second hand axis, wherein the application devices are held on the manipulator flange such that they are adjustable relative to one another in terms of their position.

In various embodiments, a first application device is non-adjustably held on the manipulator flange and can be aligned together with this, and a second application device is held on the manipulator flange by means of an adjusting device which is capable of altering the position of said application device.

BRIEF DESCRIPTION OF THE FIGURES

Further features are revealed in the description and the drawings, in which exemplary embodiments, which are described in detail below, are illustrated. The drawings show.

DETAILED DESCRIPTION

Figure 1:
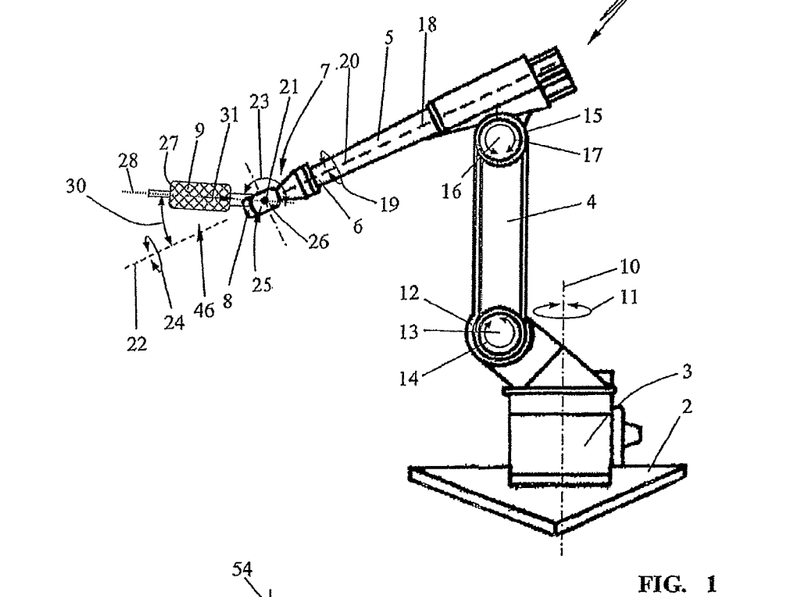
FIG. 1 a schematic illustration of a manipulator using the example of a buckling arm robot with six movement axes.

The manipulator 1 illustrated in FIG. 1 is constructed as a buckling arm robot and has a base 2 which supports a carousel 3. A swing arm 4, which supports a manipulator arm 5, is held on the carousel 3. A wrist 7, which supports a manipulator flange 8, is provided at the first, free end 6 of the manipulator arm. An end effector 46, which comprises at least one application device 9, which can be designed for example as a measuring device, as a gripping device, as a drilling tool, as a milling tool or the like, is held on the manipulator flange 8.

The carousel 3 is rotatable through 360° about a vertical main axis 10 in the direction of the double-headed arrow 11 by means of an electromotive drive. The swing arm 4 held on the carousel 3 is attached by way of a rotary joint 12 which forms a horizontal axis of rotation 13. The swing arm 4 is pivotable about the horizontal axis of rotation 13 in the direction of the double-headed arrow 14 by way of a further electromotive drive. The horizontal axis of rotation 13 forms the second main axis of the manipulator 1.

The manipulator arm 5 is held at the other end of the swing arm 4 by way of a further rotary joint 15, wherein the rotary joint 15 forms a further horizontal axis of rotation 16 which represents the third main axis of the manipulator 1. The manipulator arm 5 is pivotable about the horizontal axis of rotation 16 in the direction of the double-headed arrow 17.

The wrist 7 held at a free end 6 of the manipulator arm 5 enables rotations of the manipulator flange 8 about three hand axes, which are also referred to as secondary axes of the manipulator 1. The wrist 7 with the manipulator flange 8 is rotatable about a first hand axis 20 with respect to the manipulator arm 5, as indicated by the double-headed arrow 19. In the exemplary embodiment, the first hand axis 20 coincides with the longitudinal axis 18 of the manipulator arm 5. A second hand axis 21, about which the manipulator flange 8 is rotatable according to the double-headed arrow 23, lies at a right angle to the first hand axis 20. The wrist furthermore has a third hand axis 22 about which the manipulator flange 8 is pivotable according to the double-headed arrow 24. The third hand axis 22 lies at a right angle to the second hand axis 21.

The hand axes 20, 21 and 22 have a common intersection region 25 which—as shown in FIG. 1—can form a common intersection point 26. The intersection region 25 is advantageously a spherical region with a radius of less than 100 mm.

An end effector 46, which has an application device 9 in the form of a drill 27, is arranged on the manipulator flange 8 of the manipulator arm 5. The application device 9 is connected to the manipulator flange 8 at an attachment angle 30 to the third hand axis 22, wherein the axial forces occurring during the mechanical machining of a workpiece—during the boring operation in the exemplary embodiment according to FIG. 1—have a direction 31 which extends through the intersection region 25, in particular through the intersection point 26, of the hand axes 20, 21 and 22. As shown in FIG. 1, provision is made in particular for the longitudinal axis 28 of the drill 27 to be aligned in such a way that—in an imaginary extension—it crosses the hand axes 20, 21, 22 in the intersection region 25, in particular extends through the intersection point 26 of the hand axes. The longitudinal axis 28 of the drill 27, which corresponds to the direction 31 of the process forces occurring during the machining operation, lies at an attachment angle 30 here to the third hand axis 22.

As a result of this arrangement of the application device 9 at the attachment angle 30 to the third hand axis 22 of the wrist 7, the influence of the process forces on the machining pose of the manipulator arm 5 can be minimized. Since the direction 31 of the process forces occurring during the machining operation extends through the intersection region of the hand axes 20, 21, 22, greater moments cannot be generated around the respective hand axes 20, 21, 22 as a result of the process forces. If the direction 31 of the machining forces extends exactly through the intersection point 26 of the hand axes 20, 21 and 22, all moments of the process force around the hand axes 20, 21, 22 are completely eliminated. Since the application device 9 lies at an attachment angle 30 to the third hand axis 22, the degree of freedom of the rotation about the third hand axis 22 is maintained. The attachment angle 30 lies in an angle range of 5° to 85°; an angle range of 5° to 60° has been shown to be an advantageous attachment angle. An angle range of 30° is shown in the exemplary embodiment.

Figure 2:
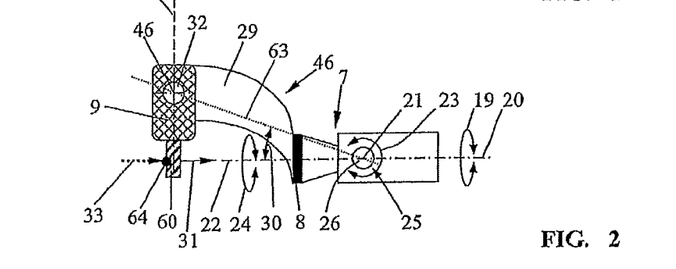
FIG. 2 an enlarged illustration of the end effector of the manipulator arm with an application device attached according to an embodiment.
Figure 3:
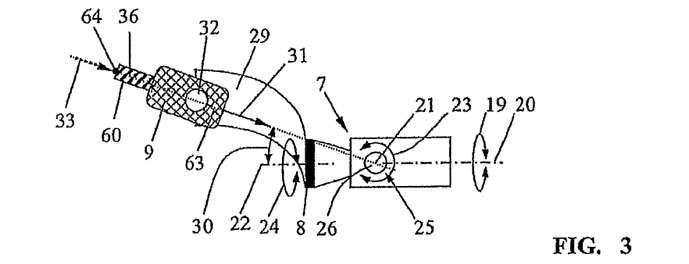
FIG. 3 an illustration of the end effector according to FIG. 2, with a pivoted operating position of the application device.

FIGS. 2 and 3 illustrate how an end effector 46 having an application device 9 is held on the manipulator flange 8 by way of a load-bearing support 29. The load-bearing support 29 is rigidly fixed to the manipulator flange 8; the application device 9 is held on the load-bearing support 29 by way of a joint 32 such that it is pivotable about a pivot axis 46. The arrangement here is such that the machining forces 33 acting on the application device 9 are introduced into the load-bearing support 29 by way of the joint 32 and are supported at the manipulator flange 8. The position of the joint 32 is selected here such that the machining forces 33 acting on the application device 9 are diverted in a direction 31 towards the manipulator arm 5, which direction extends through the intersection region 25 of the hand axes 20, 21, 22. Therefore, by choosing to support the application device 9 on the load-bearing support 29, all process forces affecting the application device 9 are diverted in the direction 31 towards the intersection region 25 or through the intersection point 26.

A side milling tool is shown as the application device 9 in the exemplary embodiment according to FIG. 2; the machining forces 33 acting laterally on the milling tool act in the direction 31, wherein the diverted forces only generate slight moments, if any, around the hand axes 20, 21 and 22.

If the application device 9 is equipped with an axial milling tool, the application device 9 is pivoted about the pivot axis 46 of the supporting joint 29 in accordance with the illustration in FIG. 3, so that the machining forces 33 acting axially on the tool 60 are diverted directly in the direction 31; as FIG. 3 shows, the direction 31 is selected so that it intersects the intersection region 25 or the intersection point 26 of the three hand axes 20, 21 and 22.

In the exemplary embodiments according to FIGS. 2 and 3, the application device 9 is held on the load-bearing support 29 by way of the joint 32, wherein the load-bearing support 29 is rigidly fastened to the manipulator flange 8. The pivot axis 46 of the joint 32 lies in an imaginary plane 54, which is arranged perpendicularly to the third hand axis 22. The spacing of the pivot axis 46 from the third hand axis 22 is selected such that the direction 31 of the machining forces 33 in each intended position of the application device 9 passes through the intersection point 26. In the view shown in FIGS. 2 and 3, perpendicularly to the pivot axis 46 of the joint 32, the pivot axis 32 and the intersection region 25 or the intersection point 26 of the hand axes 20, 21, 22 lie on a straight connecting line 63 which lies at the attachment angle 30 to the third hand axis 22 of the hand joint 7. In an embodiment, provision is made for the machining axis 36 of a tool 60 which is held in a fixed manner on the load-bearing support 29 to be aligned in such a way that it coincides with the straight connecting line 63. The machining axis 36 itself therefore lies at the attachment angle of 5° to 85°, in particular 5° to 65°, with respect to the main axis 20 of the wrist 7. The machining axis 36 itself intersects the intersection region 25 or the intersection point 26 of the hand axes 20, 21, 22 in an imaginary extension.

Figure 4:
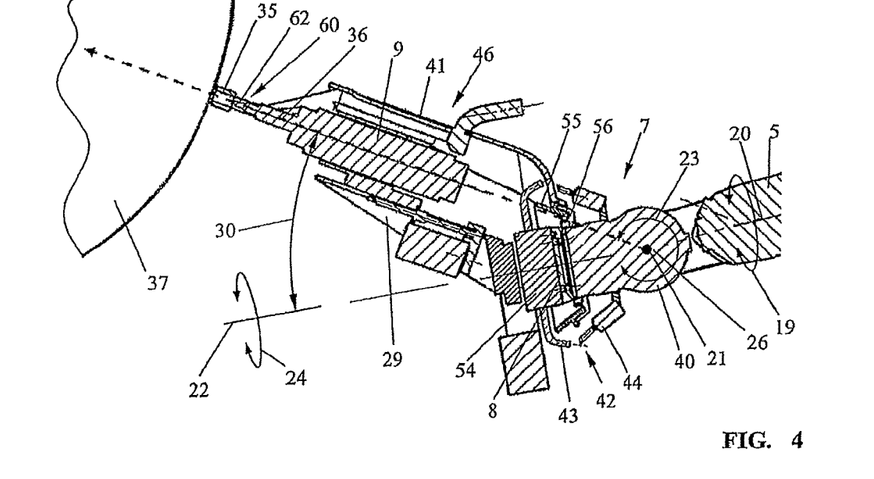
FIG. 4 a schematic illustration of a section through the end of a manipulator arm with an end effector and application device in the form of a drilling tool.

A section through a wrist 7 at the end of a manipulator arm 5 is shown in the exemplary embodiment according to FIG. 4. The manipulator flange 8 is held on a housing part 40 of the manipulator arm 5 such that it is rotatable about the third hand axis 22. Application devices 9 are fixed to the manipulator flange 8 by way of load-bearing supports 29, expediently at an attachment angle 30 of 5° to 60°, in the exemplary embodiment according to FIG. 4 at an attachment angle of 30° to the third hand axis 22.

The end effector 46 has a frame structure 41, which is rotatably mounted on the housing part 40 of the wrist 7 by way of a swivel 55. The swivel 55 is mounted on a coupling part 56 which is connected in a fixed manner to the housing part 40. The end effector 46 comprises a supporting structure 54 which is held in a fixed manner on the manipulator flange 8. The load-bearing support 29 with one or more application devices 9 is fixed to the supporting structure 54. As shown in FIG. 4, a coupling 42 is provided, which acts on the frame structure 41. The coupling 42 connects the frame structure 41 in a non-rotatable manner to the manipulator flange 8 in a first coupling position and in a non-rotatable manner to the housing part 40 in a second coupling position.

The coupling 42 comprises driver elements 43 which are held on the supporting structure 54 and which produce the non-rotatable connection with the frame structure 41 in the first coupling position. If the manipulator flange 8 is rotated about the third hand axis 22 in the first coupling position, then the application devices 9, the driver elements 43 and the frame structure 41 rotate with it.

In a second coupling position, the coupling 42 connects the frame structure 41 in a non-rotatable manner to the housing part 40. The driver elements 43 break the non-rotatable connection of the supporting structure 54 to the frame structure 41 in this coupling position. The manipulator flange 8 with the application devices 9 fixed to it is thus rotatable about the third hand axis 22 with respect to the frame structure 41 in the second coupling position.

In the exemplary embodiment, the non-rotatable connection of the frame structure 41 to the housing part 40 is effected by way of a clamping device, which comprises clamping elements 44 held on the housing part 40. In the second coupling position, the clamping elements 44 connect the frame structure 41 in a non-rotatable manner to the coupling part 56 so that the frame structure 41 is not able to rotate with respect to the housing part 40. A different structural design of the coupling 42 can also be advantageous.

To change an application device 9, the end effector 46 in the first coupling position is moved together with its frame structure 41 into a desired position. Shortly before the release of the driver elements 43, or simultaneously with the release of the driver elements 43, the frame structure 41 is non-rotatably connected to the coupling part 56 and therefore to the housing part 40, and more precisely by adjusting the clamping elements 44. The adjustment of the coupling 42 from the first coupling position into the second coupling position is effected when the manipulator flange 8 is stationary. In the second coupling position, the manipulator flange 8 is rotated about the third hand axis 22. The application devices 9 follow the rotation when the frame structure 41 is stationary, so that the application devices 9 can be brought into a position intended for the tool change. A tool change around the third hand axis 8 is thus possible with the aid of the manipulator drive. A separate drive is not required for the tool change.

In the exemplary embodiment according to FIG. 4, a ram sleeve 35 is provided on the frame structure 41, which ram sleeve can be moved axially along the machining axis 36 of the tool 60—of a drill 62 in the exemplary embodiment. This ram sleeve 35 serves to press the manipulator arm 5 against the workpiece 37 in order to pre-tension the entire system prior to the machining operation by means of the application device 9. The pre-tensioning force does not act on the manipulator flange 8 of the manipulator itself, but directly on the housing part 40 of the wrist 7. The load on the third hand axis 22 is thus relieved. Greater accuracy is achieved with a constant pre-tensioning force of the ram sleeve 35, or a greater pre-tensioning force is achieved with a constant accuracy.

As a result of the advantageous design of an end effector 46 which is rotatable about the third hand axis 22, otherwise necessary drives which align or adjust the application devices 9.1, 9.2, 9.3 (FIG. 5) with respect to the manipulator flange 8 are omitted. The end effector 46 therefore does not have a separate drive for the movement of the application devices 9.1, 9.2, 9.3 during a tool change. A change between the application devices 9.1, 9.2, 9.3 is effected in a rotatory manner around the third hand axis 22 of the manipulator arm 5 with the aid of the drive.

Figure 5:
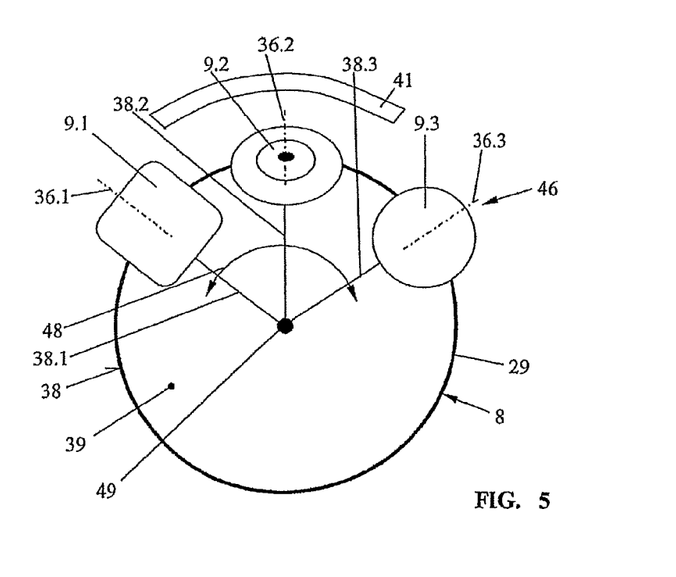
FIG. 5 a schematic view of a sketch of an end effector with a plurality of application devices arranged on the circumference of a cone.

FIG. 5 schematically shows the frame structure 41 of the end effector 46 together with application devices 9.1, 9.2 and

9.3. The machining axes 36.1, 36.2 and 36.3 of the application devices 9.1, 9.2, 9.3 coincide with surface lines 38.1, 38.2 and 38.3 of a cone 39 whereof the imaginary apex 49 lies in the intersection region 25 or in the intersection point 26 of the hand axes 20, 21, 22. The application devices 9.1, 9.2 and 9.3 follow one another in the circumferential direction on the lateral surface 38 of the cone 39.

The frame structure 41 of the end effector 46 can be coupled to and rotated with or uncoupled from the manipulator flange 8 of the manipulator 1 by way of the coupling 42 and connected to the housing part 40 by way of the coupling 42.

If the driver elements 43 connected to the supporting structure 54 on the manipulator flange 8 are coupled to the frame structure 41 and the clamping elements 44 of the coupling 42 are released, a rotation about the third hand axis 22 of the manipulator 1 results in a movement of the application devices 9 as well as the frame structure 41.

If the frame elements 43 are uncoupled from the frame structure 41 and the clamping elements 44 are tensioned, a movement about the third hand axis 22 of the manipulator merely results in the movement of the application devices 9 below the frame structure 41, which remains connected in a fixed manner to the housing part 40 of the wrist 7 by way of the clamping elements 44. A tool change is thus possible by changing the application device 9 in the direction of the double-headed arrow 48 in FIG. 5.

Figure 6:
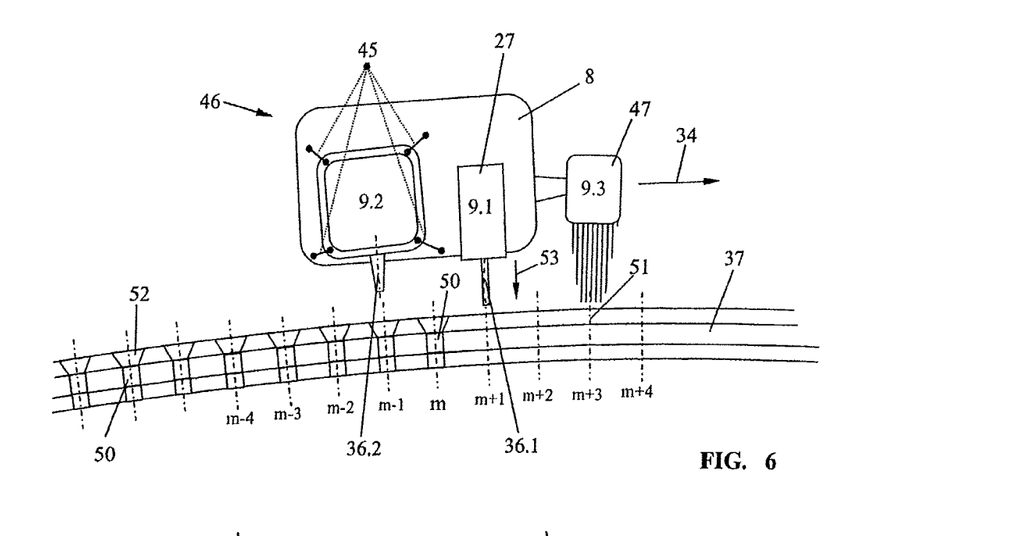
FIG. 6 a schematic illustration of a sketch of an end effector with a plurality of application devices for the simultaneous execution of operating steps on a workpiece.

In a particular design of a manipulator 1 similar to FIG. 1 having an end effector 46 having application devices, provision is made to arrange a plurality of application devices 9.1, 9.2 and 9.3 on the end effector 46, as shown in FIG. 6. A first application device 9.1—a drill 27 in the exemplary embodiment—is non-adjustably held in a fixed manner on the manipulator flange 8 and is positioned and aligned together with this with respect to the workpiece 37.

An application device 9.3 in the form of a measuring device 47, which runs ahead of the drill 27 in the process direction 34, is furthermore provided on the manipulator flange 8. A second application device 9.2, which can be designed as a rivet setter tool or the like, is furthermore provided on the manipulator flange 8. The second application device 9.2 is held in its position on the manipulator flange 8 by way of an adjusting device 45. The application device 9.2 is thus adjustable relative to the position of the application device 9.1 on the same manipulator flange 8. This is particularly expedient in the case of curved workpieces 37.

FIG. 6 illustrates how an end effector 46 of this type having a plurality of application devices 9.1, 9.2, 9.3 operates on a workpiece 37. Through-bores 50 for inserting bolts, in particular rivet bolts, are created in the workpiece 37 by means of the drill 27. In this case, different processes have to be executed by the manipulator or the application devices 9.1 to 9.3 arranged on the manipulator flange 8. Firstly, the workpiece 37 is measured by means of the measuring device 47 to determine the positioning of the end effector 46 relative to the workpiece 37. The end effector 46 is then positioned relative to the workpiece 37 so that a desired alignment of the machining axis 36.1 of the drill 27 is produced in order to then create a through-bore 50 by means of the drill 27 for the purpose of receiving a rivet bolt; the bore depth of the through-bore 50 is then measured in order to select a suitable rivet bolt on the basis of the measured bore depth. The rivet bolt is then supplied in a subsequent operating step, a sealing material is optionally applied to the rivet bolt and the rivet bolt is introduced into a through-bore 50 which has been created. By means of an appropriate tool, the rivet bolt is then seated or shaped and the seated rivet is tested. If a machining process of this type is executed in individual operating steps in serial succession, this results in a relatively long process time.

In the case of the application devices 9.1, 9.2, 9.3 of the end effector 46 according to FIG. 6, provision is made for at least two operating steps to be executed together, i.e. virtually simultaneously.

Figure 7:
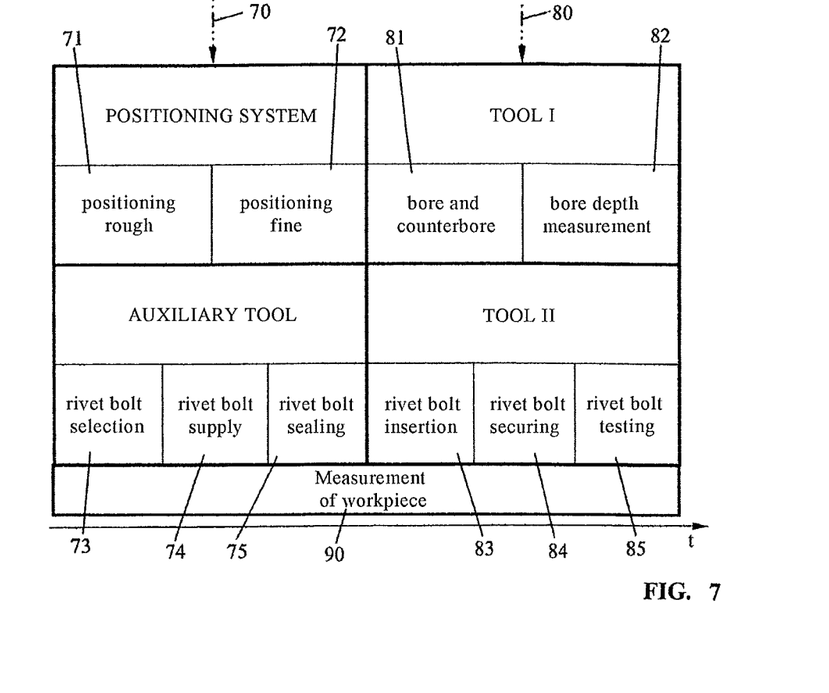
FIG. 7 a tabular overview of simultaneously executable operating steps by means of different application devices of a manipulator according to FIG. 6.

The workpiece 37 is measured by means of the measuring device 47 and the machining axis 36.1 of the drill 27 is aligned to the normal 51 of the workpiece 37 for a through-bore 50 to be created. Following the fine positioning of the manipulator flange 8, the through-hole 50 is bored into the workpiece 37 by means of the drill 27 as tool I (FIG. 7) and the counterbore 52 is then created for receiving a rivet head. According to various embodiments, provision is now made so that, with the boring of the through-bore 50 in the working direction 53, the rivet is seated in a previously-created through-bore by means of a tool II (FIG. 7). In FIG. 6, a through-bore 50 is created for example at the point m+1 by means of the drill 27 and a rivet is simultaneously inserted, secured and tested in the through bore 50 at the point m−1 by means of the application device 9.1. Simultaneously with the boring of a through-hole 50 at the point m+1 and the seating of a rivet at the point m−1, the surface of the workpiece 37 is measured by the measuring device 47 at the point m+3 lying ahead of the point in the process direction 34. According to various embodiments, three operating steps are therefore executed simultaneously at different points of the workpiece 37, wherein a significantly reduced process time is achieved by the overlapping of the operating steps.

In FIG. 7, the simultaneous implementation of operating steps is depicted schematically over time t in the columns denoted by arrows 70 and 80. Simultaneously implemented operations are shown one below another. According to Column 70, during the operation of a positioning system and a rough positioning as well as a fine positioning of the end effector 46 according to the Fields 71 and 72, a required rivet bolt can be simultaneously selected (Field 73) from a supply by way of auxiliary tools on the basis of measured values obtained in a previous operating step, the rivet bolt can be supplied (Field 74) and a sealing material can be applied to the rivet bolt (Field 75). The rough positioning of the end effector 46 here is the movement of the end effector 46 from one machining point to the next machining point and the fine positioning is the alignment of the machining axes 36.1, 36.2 perpendicularly to the workpiece surface. The measurement of the workpiece 37, on the basis of which the positioning in Fields 71 and 72 is effected, is advantageously effected continuously by the measuring device 47, as Field 90 shows.

If the end effector 46 having the application devices 9.1, 9.2, 9.3 has been positioned, the through-bore 50 can be bored and the counterbore can be created (Field 81); the bore depth is then measured (Field 82) so that the data required to select a rivet bolt (Field 73) are available. Simultaneously, in the working direction 53, by means of a parallel application device 9.2, the rivet can be inserted (Field 83), the rivet can be secured (Field 84) and finally tested (Field 85). After the new through-bore 50 has been created and the rivet bolt has simultaneously been seated in a previous through-bore, the positioning operation takes place again in the process direction 34 and an associated rivet bolt is again simultaneously selected (Field 73), supplied (Field 74) and sealed (Field 75) during the positioning operation using the data of a previous measurement.

In the process direction 34, the position of the normal 51 for an upcoming through-bore 50 is recorded at the point m+3 by the measuring device 47. The measuring method can be tactile, pneumatic, electromagnetic, optical or the like.

A bore is simultaneously bored at the point m+1 and measured in terms of diameter and depth. During the boring operation in the working direction 53, a rivet bolt is inserted and secured in the already-created through-bore 50 at the point m−1. The application of a sealing medium to the rivet can be effected beforehand during the positioning of the end effector 46 or the rivet.

If the through-bore 50 is bored at the point m−1 and the rivet bolt is secured, the application device 9.2 is moved to the point m+2 and the machining axis 36.2 is aligned perpendicularly to the workpiece surface at the point m+2. During this positioning operation, the rivet bolt is selected for the through-bore m and the application device 9.2 (Tool II) is supplied for inserting/securing and testing the rivet bolt.

The invention claimed is:

1. A manipulator, comprising a manipulator arm at the free end of which a manipulator flange is provided on which an end effector having an application device for machining a workpiece is held, wherein the manipulator flange is rotatable about first, second, and third hand axes and the first hand axis extends in the direction of the longitudinal axis of the manipulator arm, the second hand axis extends transversely to the first hand axis and the third hand axis lies transversely to the second hand axis,
    wherein the end effector is rotatably mounted on the wrist of the manipulator arm, wherein the end effector has a plurality of application devices which follow one another in the circumferential direction on a lateral surface of an imaginary cone, wherein an application device can be moved into an active operating position by rotation of the manipulator flange about the third hand axis, and
    wherein the manipulator does not comprise a drive between the manipulator flange and the plurality of application devices.

2. The manipulator according to claim 1, wherein the end effector has a frame structure which, by way of a coupling, is non-rotatably connected to a housing part of the manipulator arm in a first coupling position and is non-rotatably connected to the manipulator flange in a second coupling position.

3. The manipulator according to claim 2, wherein the coupling comprises driver elements of the end effector and a clamping device acting between the housing part and the frame structure.

4. The manipulator according to claim 2, wherein a ram sleeve, which is movable along a machining axis of the tool towards the workpiece, is held on the frame structure.

* * * * *